Sept. 14, 1926.  1,599,689
W. M. SWEET
DIRIGIBLE SPOTLIGHT
Filed April 1, 1925
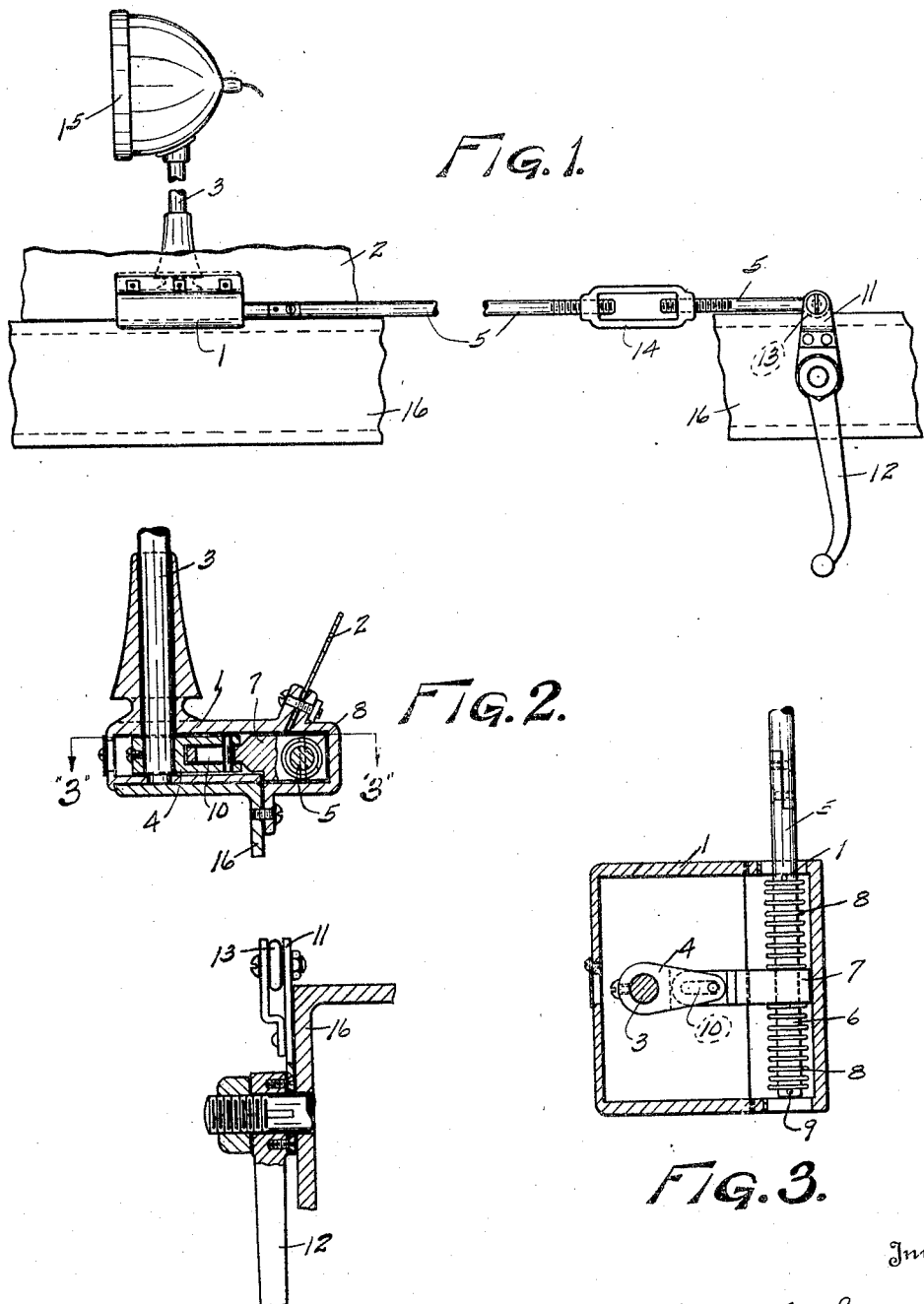

Patented Sept. 14, 1926.

1,599,689

UNITED STATES PATENT OFFICE.

WILLIS M. SWEET, OF NILES, MICHIGAN.

DIRIGIBLE SPOTLIGHT.

Application filed April 1, 1925. Serial No. 19,805.

This invention is a dirigible spot light for automobiles, and the object is to provide a simply constructed, practical device of the kind.

In the drawing—

Figure 1 is a side elevation of the assembled device;

Figure 2 is a transverse vertical section of the bearing block;

Figure 3 is a horizontal section taken on the line "3—3" of Figure 2;

Figure 4 is a detail of the steering arm finger.

In carrying out the invention a bearing block 1 is mounted upon the front of the fender 2 of an automobile. Vertically journaled in the bearing block 1 is a lamp supporting pin 3 which is provided with a laterally extended finger 4. Slidingly mounted thru the bearing block 1 is a jointed lamp control rod 5 carrying upon its forward end 6 a connecting arm 7 which is slidably disposed between coil springs 8. Pins 9 are passed thru the lamp control rod 5 on the extremities of the coil springs 8 so as to keep the said coil springs in a compressed position. The connecting arm 7 is slotted as shown at 10 and with this slotted portion is adapted to engage the finger 4 of the lamp supporting pin 3. A steering arm finger 11 is rigidly secured to the external steering arm 12 which is located at the outer side of the main frame 16 of the automobile. The lamp control rod 5 is adapted to engage the steering arm finger 11 with its looped end 13. A turnbuckle 14 is incorporated in the said lamp control rod 5 to permit adjusting the lamp supporting pin 3 so as to throw the light rays of the lamp 15, which is mounted on the lamp supporting pin 3, at the desired point ahead of the automobile.

While a specific manner is here shown for connecting the control rod 5 to the steering mechanism of certain type of cars, for cars of different types (not shown) the specific connecting links here shown may have to be modified somewhat, and while I have herein described a certain specific manner and method of contructing and assembling the elements of my invention, it is understood that I may vary from the same in minor details, not departing from the spirit of my invention, so as best to construct a practical device for the purpose intended, as defined in the appended claim.

I claim:

In a dirigible spot light for an automobile, a device of the kind described, comprising a bearing block mounted upon the front of the fender; a lamp supporting pin vertically journaled in said block; a finger extended laterally from said pin; a steering arm finger secured to the steering arm; a control rod slidingly mounted thru the bearing block and pivotally secured to said steering arm finger; a slotted connecting arm slidably mounted upon the control rod and pivotally secured to the extended finger thru the slotted portion; compressed coil springs mounted upon the control rod on each side of the connecting arm; a lamp secured to the supporting pin; and means mounted in the control rod for properly adjusting the position of the lamp in relation to the position of the steering arm.

In testimony whereof I affix my signature.

WILLIS M. SWEET.